UNITED STATES PATENT OFFICE.

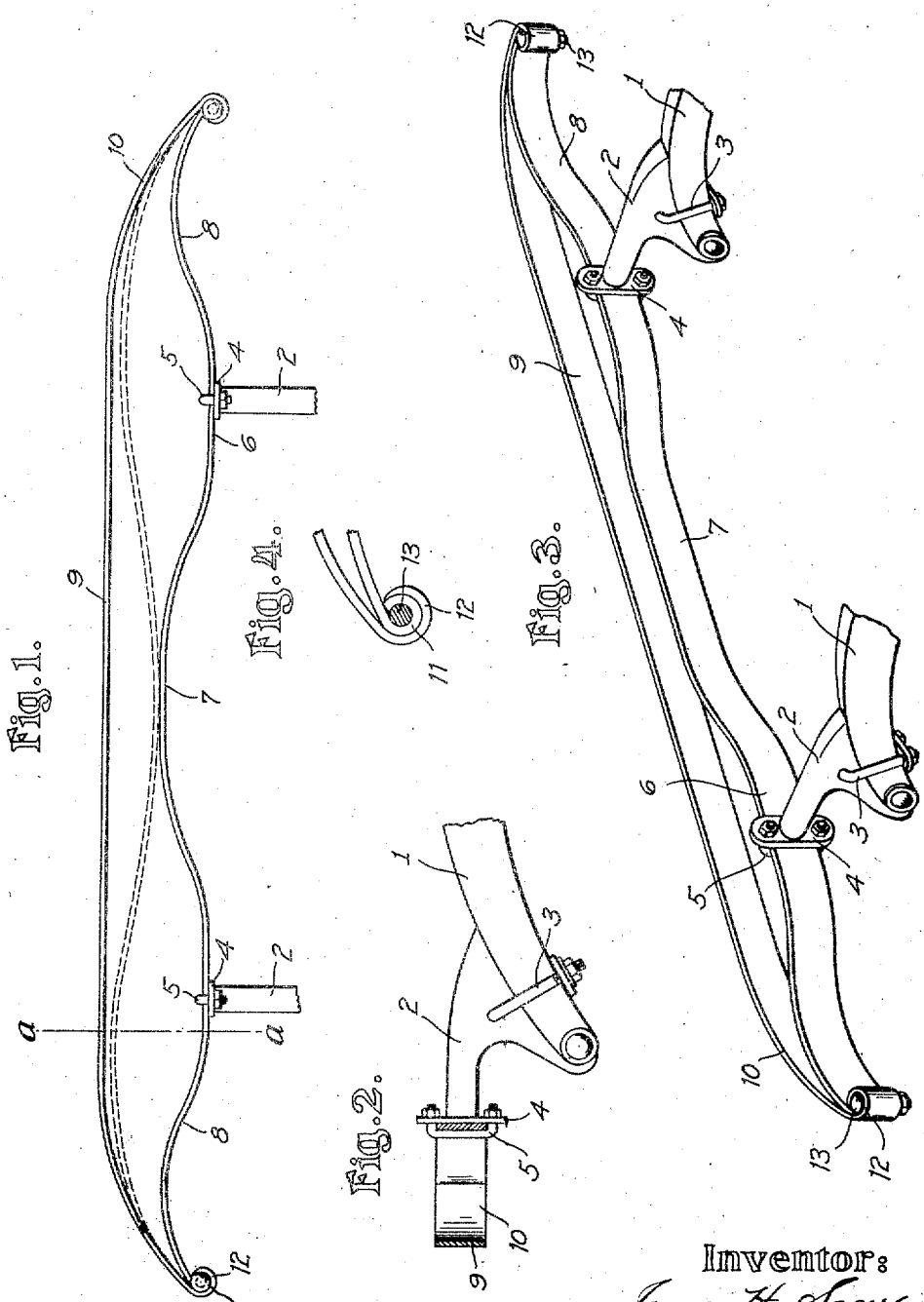

JAMES H. SAGER, OF ROCHESTER, NEW YORK, ASSIGNOR TO J. H. SAGER COMPANY, OF ROCHESTER, NEW YORK, A CORPORATION OF NEW YORK.

SPRING-BUMPER.

1,208,382.            Specification of Letters Patent.            Patented Dec. 12, 1916.

Application filed April 1, 1916. Serial No. 88,339.

*To all whom it may concern:*

Be it known that I, JAMES H. SAGER, a citizen of the United States, and resident of Rochester, in the county of Monroe and State of New York, have invented certain new and useful Improvements in Spring-Bumpers, of which the following is a specification.

The present invention relates to bumpers for motor vehicles and more particularly to the type which are arranged at the front of the vehicle for receiving blows to prevent shocks being transmitted to the vehicle, and an object of the invention is to provide a construction which will readily absorb the shocks without the employment of coil springs and expensive guiding surfaces.

Another object of the invention is to provide a simple and inexpensive construction in which an auxiliary or supplemental resisting means is brought into action after the bumper has yielded to a certain extent.

To these and other ends the invention consists of certain parts and combinations of parts all of which will be hereinafter described, the novel features being pointed out in the appended claims.

In the drawings:—Figure 1 is a plan view of a bumper constructed in accordance with the present invention; Fig. 2 is a section on the line *a—a* of Fig. 1; Fig. 3 is a perspective view of the bumper; and Fig. 4 is a horizontal sectional view through the connection between the two spring bars.

Referring more particularly to the drawings, 1 indicates the longitudinal frame bars of a motor vehicle to which attaching brackets 2 are secured in any suitable manner, as, for instance, by means of U-clamps 3 passed through the bracket and about the vehicle frame bars 1. These brackets preferably extend forwardly from the frame bars and have enlarged ends 4 carrying U-shaped clamps 5. To these clamps is secured a resilient rear bar 6 formed preferably of spring tempered steel, the clamps engaging the rear bar at points spaced from the ends of the latter. Between the clamps the bar 6 is deflected forwardly at 7 to provide a supplemental or auxiliary impact-receiving portion, as will be hereinafter described, and beyond the attaching brackets or clamps the ends 8 of the rear bar are each bent on an ogee curve forming a resilient portion to which the front bar 9 is secured.

The front bar is preferably formed of spring tempered steel and is normally straight throughout the greater portion of its length but has the end portions 10 deflected rearwardly and secured to the free ends of the rear bar 6. In this instance, the rear bar is bent at each end to form an eye or sleeve 11 and about this sleeve or eye the adjacent end of the front bar 9 is bent at 12. A bolt 13 passes through each sleeve 12 and has its head and nut large enough to project over the sleeve portion 12 of the front bar, thus securing the two bars together and at the same time permitting such end of the front bar to turn on the sleeve 11.

When a light blow is received by the front bar, the latter bends or flexes inwardly between its ends to a degree corresponding to the blow and, at the same time, the resilient ends 8 of the rear bar yield to permit this flexing. For heavy blows, the front bar 9 will flex or bend rearwardly until it engages the forwardly-deflected portion of the rear bar, which will then act as an auxiliary or supplemental bumper.

From the foregoing, it will be seen that there has been provided a bumper for motor vehicles which will absorb shocks without the use of coil springs or guides on which the bumper moves. A resilient or spring steel bar is employed which flexes between its ends, the latter being resiliently supported. These resilient supports are in the form of yielding ends on a second or rear bar which is so formed as to act as a supplemental or auxiliary bumper after the main impact-receiving portion has been flexed to a certain degree.

What I claim as my invention and desire to secure by Letters Patent is:—

1. A bumper for motor vehicles comprising a resilient front bar, a resilient rear bar attached at its ends to ends of the front bar and deflected forwardly between its ends for engagement by the front bar, the forwardly deflected portion being free of the front bar, and attaching brackets secured to the rear bar in spaced relation to the ends of the latter and on opposite sides of the forwardly deflected portion.

2. A bumper for motor vehicles comprising two flexible bars one in advance of the other, the front bar being supported by the rear bar and the rear bar having a supplemental impact receiving portion free of said front bar but engaged by the latter after said front bar has been bent rearwardly.

JAMES H. SAGER.